United States Patent [19]

Lepp

[11] 4,042,256
[45] Aug. 16, 1977

[54] HITCH ASSEMBLY
[76] Inventor: David Lepp, 4817 E. Turner, Fresno, Calif. 93727
[21] Appl. No.: 684,285
[22] Filed: May 7, 1976
[51] Int. Cl.² ............................................. B60D 1/06
[52] U.S. Cl. .................................................. 280/512
[58] Field of Search ................ 280/504, 511, 512, 513
[56] References Cited
U.S. PATENT DOCUMENTS

| | | | |
|---|---|---|---|
| 2,475,878 | 7/1949 | Clark et al. | 280/512 |
| 2,673,096 | 3/1954 | Bendtsen | 280/504 |
| 2,902,294 | 9/1959 | Kirkpatrick | 280/512 |
| 3,046,038 | 7/1962 | Hollis | 280/512 |

Primary Examiner—Robert R. Song
Attorney, Agent, or Firm—Huebner & Worrel

[57] ABSTRACT

A hitch assembly having a base defining a path of travel, a cam member borne by the base for movement about an axis substantially normal to the path of travel, a pair of grasping members received on the base in juxtaposition for movement along the path of travel and having cam ways through which the cam member is extended, and a lever affixed on the cam member and movable to cause the cam member in engagement with the cam ways to move the grasping members along the path of travel between opened and closed positions.

6 Claims, 5 Drawing Figures

HITCH ASSEMBLY

BACKGROUND OF THE INVENTION

1. Field of the Invention

The present invention relates to an improved hitch assembly and more particularly to such a hitch assembly which possesses a safety and dependability of operation in combination with a facility of use not heretofore achieved.

2. Description of the Prior Art

Hitch assemblies of a variety of types, constructions and modes of operation have long been known. Typical of such prior art hitch assemblies are the devices disclosed by the Anderson U.S. Pat. No. 1,336,181; the Clark et al. U.S. Pat. No. 2,475,878; the Wolfrum U.S. Pat No. 2,481,461; the Bendtsen U.S. Pat. No. 2,673,096; and the Marler U.S. Pat. No. 3,658,363. Such prior art devices possess attributes in one or more respects. However, the exigencies and abuse of normal use have made the hitch assemblies heretofore known in the art deficient in one or more respects.

In normal use, hitch assemblies are placed under great stress particularly with respect to the load bearing portions of such assemblies and with respect to the portions of the assemblies taking the brunt of the drawing forces exerted during normal operation. Additionally, such devices must afford a structure which is sufficiently dependable so as to preclude failure during use by inadvertent release. Of course, it is also desirable that such devices be easy to connect and disconnect so as to insure an ease of operation. Unfortunately, it has been found in the prior art devices that such considerations are often in direct conflict. Thus, for example, a hitch assembly which may be easy to operate is often not as dependable as desired.

Therefore, a hitch assembly which is dependable and durable in use, which is of a structure reducing to an absolute minimum the possibility of inadvertent release and which is operated by the simplest and most rapid of procedures has long been sought, but has not heretofore been achieved.

SUMMARY OF THE INVENTION

Therefore, it is an object of the present invention to provide an improved hitch assembly.

Another object is to provide such a hitch assembly which achieves a secure and reliable connection.

Another object is to provide a hitch assembly which is operable to support a great workload.

Another object is to provide such a hitch assembly which is easily able to withstand the mistreatment or abuse encountered in normal use.

Another object is to provide such a hitch assembly which employs a minimum number of operative components linked in a novel interoperative relationship to minimize the possibility of inadvertent release.

Another object is to provide such a hitch assembly which incorporates operative components which accomplish multiple functions so as securely to grasp the object to which connection is to be made while automatically reinforcing the grasping members against inadvertent release.

Another object is to provide such a hitch assembly which possesses a facility of operation not heretofore achieved in the art.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
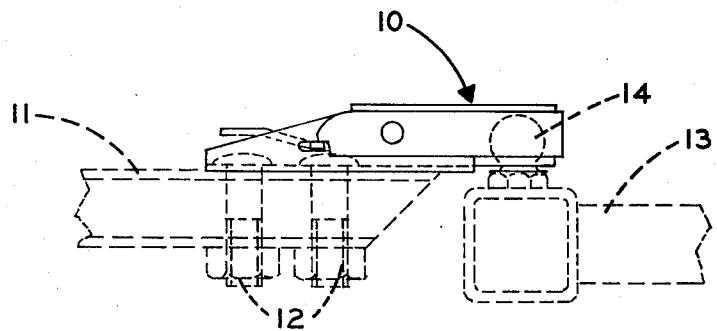
FIG. 1 is a side elevation of the hitch assembly of the present invention shown in a fragmentary representative operative environment.

Referring more particularly to the drawing, the hitch assembly of the present invention is generally indicated by the numeral 10 in FIG. 1. A trailer tongue 11 is shown for illustrative convenience in FIG. 1 mounting the hitch assembly thereon by means of a pair of bolt and nut assemblies 12. A drawbar 13 of a towing vehicle mounts a conventional ball connection 14. The hitch assembly of the present invention is, of course, designed to interconnect the trailer tongue and the ball connection for the purposes of towing.

The hitch assembly 10 has a frame or base 20 which can conveniently be formed from a channel member. The base has a forward end 21 and a rearward end 22. The base has a substantially flat back portion 23 having a pair of bolt holes 24 extending therethrough adjacent to the rearward end of the base. The base has integral, substantially parallel upstanding side portions 25 which extend upwardly from the back portion to upper edges 26. The upper edges adjacent to the forward end 21 of the base are substantially parallel to the back portion. The upper edges adjacent to the rearward end 22 of the base are sloped diagonally downwardly toward the rearward end, as best shown in FIGS. 3 and 5.

The side portions 25 of the base 20 have shaft slots 27 disposed in predetermined positions therein aligned substantially transversely of the base and extended from the upper edges of the side portions toward the back portion 23 predetermined corresponding distances. The side portion of the base in the upper position, as viewed in FIGS. 2 and 4, has the latch hole 28 disposed between the shaft slot 27 of that side portion and the rearward end 22 of the base. The side portion and the lower position, as viewed in FIGS. 2 and 4, have a latch slot 29 extending therethrough aligned with the latch hole of the opposite side portion and elongated along an axis substantially parallel to the back portion of the base in the direction of the rearward end of the base. The back portion and side portions of the base define a path of travel 30 extending longitudinally through the base.

Figure 2:
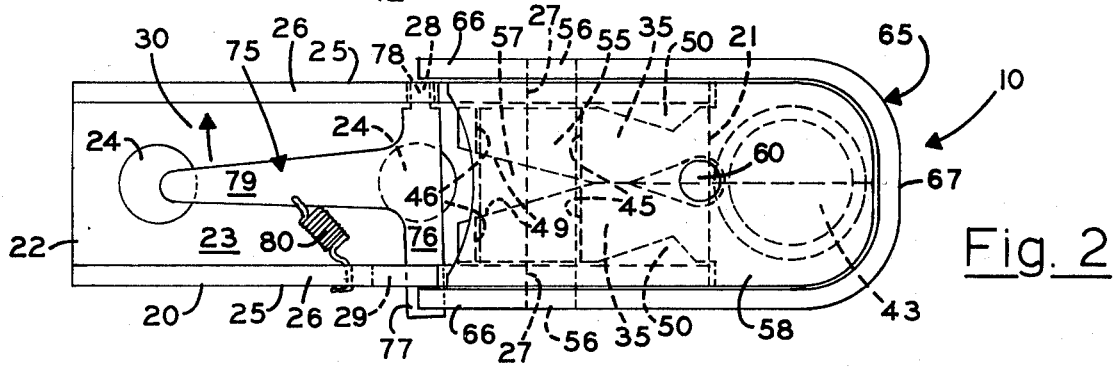
FIG. 2 is a somewhat enlarged top plan view of the hitch assembly.
Figure 3:
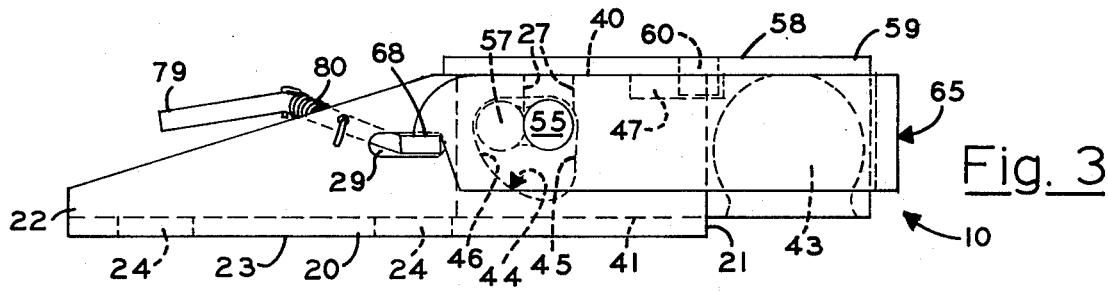
FIG. 3 is a side elevation of the hitch assembly.
Figure 4:
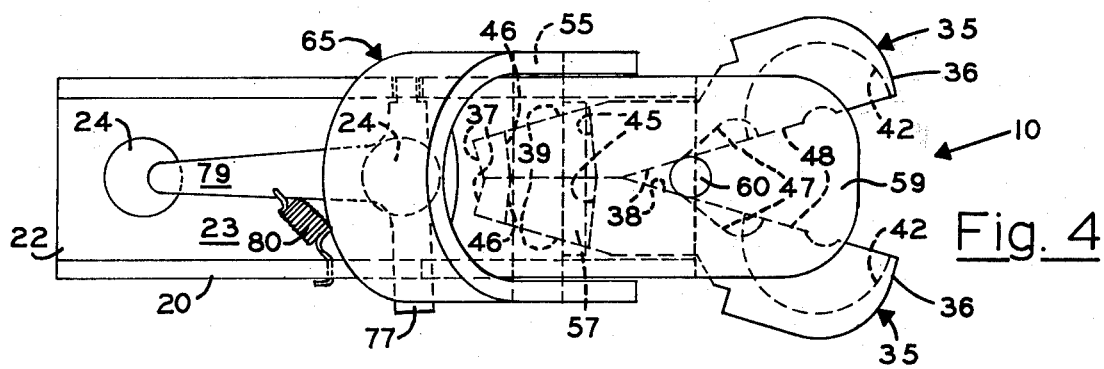
FIG. 4 is a top plan view of the hitch assembly with grasping members thereof extended in the opened positions.
Figure 5:
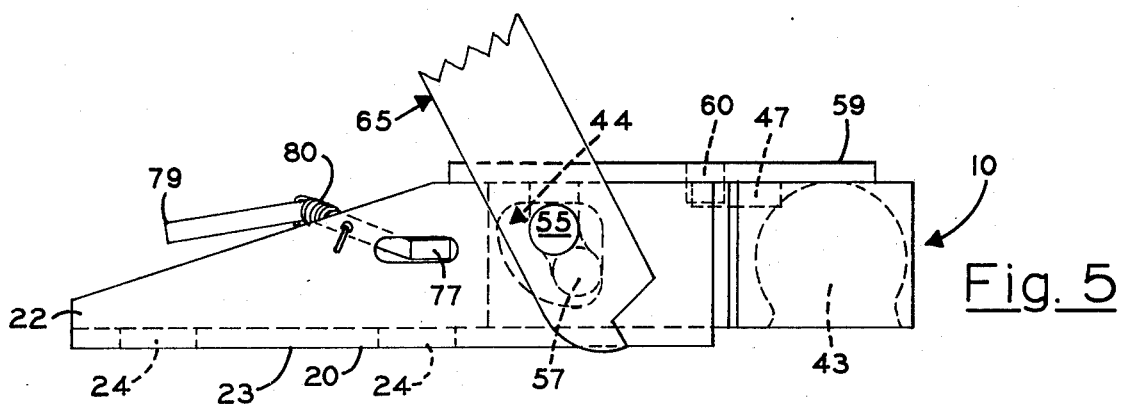
FIG. 5 is a fragmentary side elevation of the hitch assembly with the grasping members disposed as shown in FIG. 4.

A pair of cooperative grasping members of jaws 35 are received within the base 20 between the side portions 25 for movement along the path of travel 30 between first or opened positions, as shown in FIGS. 4 and 5, and second or retracted positions as shown in FIGS. 1, 2 and 3, in a grasping attitude. The jaws each have a forward end portion 36 and a rearward end portion 37. Each of the jaws has an interior side 38 and an exterior side 39 having configurations hereinafter to be described. Each of the jaws has substantially parallel upper and lower sides 40 and 41 respectively. The forward end portion 36 of each jaw has a ball receptacle 42 therein communicating with the lower side 41 thereof through an opening 43. The ball receptacles form a chamber adapted snugly to fit around the ball connection 14 when the forward end portions 36 of the jaws are disposed in abutting relation as shown in FIGS. 2 and 3.

The rearward end portions 37 of the jaws 35 have first cam ways 44 of substantially identical configurations extending transversely therethrough. The rearward end portion bounding each first cam way has a substantially flat surface 45 connecting with a concave surface 46. A second cam way 47 of the configuration visible in FIGS. 2 and 4 is provided in each jaw communicating with the interior and upper sides 38 and 40 respectively thereof the located in predetermined positions just rearwardly of and above the ball receptacles 42. The interior side of each jaw is composed of a forward surface 48 and a diagonally related rearward surface 49, as best shown in FIGS. 2 and 4. The exterior side 39 of each jaw has a notch 50 disposed approximately midway between the forward and rearward end portions 36 and 37 of the jaw.

A shaft 55 is rotationally received in the shaft slots 27 extending substantially transversely the path of travel 30 defined by the base 20. The shaft has opposite ends 56 and mounts a cam lobe 57 thereon between the side portions 25 of the base. The shaft and a cam lobe extend through the first cam ways 44 of the jaws.

A cover plate 58 is secured, as by welding, on the upper edges 26 of the side portions in overlaying relation to the jaws. The cover plate has a forward portion 59 which extends outwardly over the forward end portions 36 of the jaws. A cam peg 60 is mounted on the cover plate and is extended therefrom between the second cam ways 47 of the jaws.

A closure or lever 65 is fastened, as by welding, on the opposite ends 56 of the shaft 55. The lever has substantially parallel end portions 66 extending toward the rearward end 22 of the base 20. The lever has a return bent portion 67 which is integral with the parallel end portions 66. The return bent portion of the lever extends about the forward end portions 36 of the jaws 35 in a locking position when the jaws are disposed in the relationship shown in FIGS. 2 and 3. The lever is movable with the shaft to a release position shown in FIGS. 4 and 5. The end portion 66 of the lever which is visible in FIGS. 3 and 5, is notched so as to form a catch 68.

A latch assembly 75 is mounted on the base 20 immediately rearwardly of the end portions 66 of the lever 65. The latch assembly has a latch arm 76, having a latch end portion 77 extending through the latch slot 29 for selective engagement with the catch 68 of the lever. The opposite end of the latch arm has a pin 78 received in the latch hole 28. A lever arm 79 is integral with and extended from the latch arm substantially normal thereto. The latch arm extends in the direction of the rearward end 22 of the base. A tension spring 80 interconnects the lever arm and the base resiliently to retain the latch arm to the position best shown in FIG. 2.

OPERATION

The operation of the described embodiment of the subject invention is believed to be clearly apparent and is breifly summarized at this point. As can best be visualized in FIG. 1, the hitch assembly 10 is mounted on the trailer tongue 11 by means of the pair of bolt and nut assemblies 12 extending through the bolt holes 24 of the base 20 to secure the forward end 21 of the base extending forwardly from the trailer tongue. When it is desired to connect the trailer tongue to the ball connection 14 of the drawbar 13, the tongue is positioned adjacent to the ball connection and the lever 65 motivated to the raised position shown in FIGS. 4 and 5. In order to release the lever for the movement to the raised position, the lever arm 79 of the latch assembly 75 is moved against tension of the spring 80 from the side portion 25 to which it is connected to draw the latch end portion 77 from the catch 68. The return bent portion 67 of the lever 65 is then simply grasped and moved to the raised position.

Movement of the lever 65 to the raised position causes the shaft 55 to be rotated within the shaft slots 27 thereby drawing the cam lobe 57 in a counter clockwise direction as viewed in FIG. 3 from the position shown in FIG. 3 to the position shown in FIG. 5. Such movement causes the cam lobe to be drawn against the flat surfaces 45 of the first cam ways 44 and, accordingly, to urge the jaws 35 forwardly along the path of travel 30. During such movement of the jaws, the cam peg 60 engages the second cam ways 47 of the jaws causing them to be moved to the extended, opened positions relative to each other, as shown in FIG. 4. The notches 50 accomodate movement of the jaws relative to the side portions 25, as can best be seen in FIG. 4.

With the jaws 35 in the extended, open positions, the forward end portions 36 of the jaws are simply positioned over and about the ball connection 14 with the ball receptacles 42 disposed on opposite sides of the ball connection. The forward portion 59 of the cover plate and the forward end portions of the jaws can then simply be rested on the ball connection. Thereafter, the lever 65 is drawn downwardly to the position shown in FIGS. 2 and 3 whereupon the latch end portion 77 is again drawn into engagement with the catch 68 of the lever to lock the lever in the lowered position. Downward movement of the lever causes the shaft 55 and thus the cam lobe 57 to be moved within the first cam ways 44 from the position shown in FIG. 5 to the position shown in FIG. 3. Such movement draws the cam lobe out of engagement with the flat surface 45 and into engagement with the concave surface 46 so as to cause rearward movement of the jaws 35 along the path of travel 30 to the positions shown in FIGS. 2 and 3. During such movement the interior sides 38 of the jaws pivot about the junctures of the forward and rearward surfaces 48 and 49 respectively thereof to cause the forward end portions 36 of the jaws to be drawn into engagement thereby to capture the ball connection 14 within the ball receptacles 42 of the forward end portions. The hitch assembly 10 is thereby securely connected to the ball connection for any desired towing operations.

It will be seen that the lever 65 accomplishes the dual function of motivating the jaws 35 between the extended and retracted positions and operating as a secondary means of maintaining the forward end portions 36 of the jaws in engagement in the retracted position for towing. The latch assembly 75 operates to prevent inadvertent pivoting of the lever to the raised position during such towing operations and yet is easily operable to release the lever 65 when such release is desired. Similarly the forward portion 59 of the cover plate 58 operates to reinforce the forward end portions 36 of the jaws against vertical displacement.

Therefore, the hitch assembly of the present invention provides a durable and fully reliable means for interconnecting vehicles for towing operations; operates automatically to afford secondary reinforcement for the operative components of the hitch assembly during towing operations; and provides a facility of use and a reliability of operation not heretofore achieved.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A hitch assembly comprising a frame having a path of travel extending therethrough, a shaft mounted on the frame for movement about an axis substantially transverse to the path of travel, a pair of grasping members received on said frame in juxtaposition for movement along the path of travel and having cam ways through which the shaft is extended, a lever borne by the shaft and being movable to cause rotation of the shaft, and cam means affixed on the shaft for engagement with the cam ways of the grasping members to cause movement of the grasping members along said path of travel between extended opened positions and retracted closed positions upon movement of the lever.

2. The hitch assembly of claim 1 wherein the grasping members have second cam ways spaced from the first cam ways and the frame mounts a cam extending into the second cam ways to cause separation of the grasping members during said movement to the opened positions.

3. The hitch assembly of claim 2 wherein the grasping members have forward end portions individually defining receptacles communicating with a predetermined side of the members for the receipt of an object to be grasped and the frame mounts a plate extending over the grasping members on the side thereof opposite to said predetermined side to brace said grasping members.

4. The hitch assembly of claim 3 wherein the shaft has opposite ends extending laterally of the frame and the lever is borne on the opposite ends extending in a return bent configuration about the forward end portions of the grasping members when said members are in closed positions to capture said end portions.

5. The hitch assembly of claim 4 wherein the lever has an end portion extending on the opposite side of the shaft from the return bent portion of the lever and the frame mounts a latch assembly in position lockably to engage said end portion of the lever when said lever is extended about the end portions of the grasping members.

6. The hitch assembly of claim 5 wherein the latch assembly includes an arm which is retained by a spring in position resiliently to restrain the latch assembly in said engagement with the end portion of the lever and alternatively is movable against action of the spring to retract the latch assembly from engagement with said end portion of the lever.

* * * * *

UNITED STATES PATENT AND TRADEMARK OFFICE
CERTIFICATE OF CORRECTION

PATENT NO. : 4,042,256
DATED : August 16, 1977
INVENTOR(S) : David Lepp

It is certified that error appears in the above-identified patent and that said Letters Patent are hereby corrected as shown below:

Column 1, Line 49, after "provide" insert --- such ---.

Column 2, Line 60, after "members" delete "of" and insert --- or ---.

Column 3, Line 18, after "thereof" delete "the" and insert --- and ---.

Column 3, Line 67, delete "breifly" and insert --- briefly ---

Column 4, Line 9, after "for" and before "movement" delete "the".

Column 4, Line 29, delete "accomodate" and insert --- accommodate ---.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*